(12) United States Patent
Mun

(10) Patent No.: US 7,308,265 B2
(45) Date of Patent: Dec. 11, 2007

(54) DEVICE AND METHODS FOR ACQUIRING A PUBLIC LAND MOBILE NETWORK OF A MOBILE STATION AND PROVIDING PUBLIC LAND MOBILE NETWORK INFORMATION IN A CELLULAR COMMUNICATION SYSTEM

(75) Inventor: Hyun-Jung Mun, Songnam-si (KR)

(73) Assignee: Samsung Electronics Co., Ltd. (KR)

( * ) Notice: Subject to any disclaimer, the term of this patent is extended or adjusted under 35 U.S.C. 154(b) by 705 days.

(21) Appl. No.: 10/751,711

(22) Filed: Jan. 5, 2004

(65) Prior Publication Data

US 2004/0137927 A1 Jul. 15, 2004

(30) Foreign Application Priority Data

Jan. 3, 2003 (KR) .................. 10-2003-0000359

(51) Int. Cl.
*H04Q 7/20* (2006.01)
(52) U.S. Cl. .................. 455/443; 455/434; 455/435.1; 455/436
(58) Field of Classification Search ..... 455/434–453.3; 370/331, 503, 509
See application file for complete search history.

(56) References Cited

U.S. PATENT DOCUMENTS 5,999,811 A * 12/1999 Molne ..................... 455/432.3
6,122,512 A * 9/2000 Bodin ........................ 455/440
6,256,500 B1 * 7/2001 Yamashita .................. 455/441
7,006,465 B2 * 2/2006 Toshimitsu et al. ......... 370/328
7,054,638 B2 * 5/2006 Rune et al. ................. 455/450
7,113,786 B2 * 9/2006 Proctor, Jr. ................. 455/442
7,142,860 B2 * 11/2006 Mildh et al. ................ 455/443
2002/0105927 A1 * 8/2002 Holma et al. ............... 370/331
2002/0187749 A1 * 12/2002 Beasley et al. ............... 455/41
2004/0242260 A1 * 12/2004 Lescuyer .................... 455/525
2005/0075125 A1 * 4/2005 Bada et al. ................. 455/525
2005/0221846 A1 * 10/2005 Jansen ........................ 455/502

* cited by examiner

*Primary Examiner*—Nay Maung
*Assistant Examiner*—Dominic E. Rego
(74) *Attorney, Agent, or Firm*—The Farrell Law Firm

(57) ABSTRACT

Methods for acquiring a public land mobile network (PLMN) of a mobile station and providing PLMN information of a base station in a cellular communication system and a base station capable of guaranteeing an acquisition of a home PLMN for registering a mobile station in a home base station which forms an overlapped signal cell together with a base station operated by a second business operator using the same frequency. It is determined whether a corresponding base station is a home PLMN. Cell overlapped information is extracted from the system information when the corresponding base station is not the home PLMN. The cell overlapped information indicates that the home base station forms an overlapped cell together with the base station operated by the second business operator. A PLMN acquisition procedure for different slot synchronizations with respect to an identical frequency is executed based on the cell overlapped information.

14 Claims, 9 Drawing Sheets

| Information Element | | Type | Description |
|---|---|---|---|
| CN information elements | | | |
| PLMN IDENTITY | | | |
| CN Overlapped Flag | | Boolean | PUBLIC LAND MOBILE NETWORK EXISTENCE INFORMATION USING SAME FREQUENCY |
| ⋮ | | | |

FIG.4A

| Information Element | Type | Description |
|---|---|---|
| CN information elements | | |
| PLMN IDENTITY | | |
| Overlapped CN Info | | |
| > Scrambling Code | | SCRAMBLING CODE USED IN CELL OF OVERLAPPED PUBLIC LAND MOBILE NETWORK |
| > Timing Offset | | TIMING OFFSET WITH CELL OF OVERLAPPED PUBLIC LAND MOBILE NETWORK |
| ⋮ | | |

FIG.4B

| Information Element | Type | Description |
|---|---|---|
| CN information elements | | |
| PLMN IDENTITY | | |
| Overlapped CN Info | | |
| > PLMN ID | | IDENTIFICATION OF OVERLAPPED PUBLIC LAND MOBILE NETWORK |
| ⋮ | | |

FIG.4C

| Information Element | Type | Description |
|---|---|---|
| CN information elements | | |
| PLMN IDENTITY | | |
| Overlapped CN Info | | |
| > Number of PLMN | | THE NUMBER OF OVERLAPPED PUBLIC LAND MOBILE NETWORKS |
| ⋮ | | |

FIG.4D

DEVICE AND METHODS FOR ACQUIRING A PUBLIC LAND MOBILE NETWORK OF A MOBILE STATION AND PROVIDING PUBLIC LAND MOBILE NETWORK INFORMATION IN A CELLULAR COMMUNICATION SYSTEM

PRIORITY

This application claims priority to an application entitled "Method for Acquiring Public Land Mobile Network of Mobile Station and Providing Public Land Mobile Network Information in Cellular Communication System, and Base Station Executing the Same" filed in the Korean Industrial Property Office on Jan. 3, 2003 and assigned Serial No. 2003-00359, the contents of which are hereby incorporated by reference.

BACKGROUND OF THE INVENTION

1. Field of the Invention

The present invention relates generally to a method for acquiring a public land mobile network (PLMN) of a mobile station in a cellular communication system. More particularly, the present invention relates to methods for acquiring a PLMN of a mobile station in a frequency overlapping area and providing PLMN information of a base station in a cellular communication system and a base station executing the methods, which enable an acquisition of a home PLMN for registering a mobile station in a home base station that forms an overlapped signal cell together with another base station, i.e., a base station set by a mobile communication operator which provides a mobile communication service to a mobile station, using the same frequency.

2. Description of the Related Art

Conventionally, a mobile station performs a PLMN acquisition procedure in order to register itself in a base station of a corresponding PLMN in an asynchronous cellular communication system. A PLMN acquisition method is a method carried out first during a power-on of the mobile station. The PLMN acquisition procedure includes a slot synchronization acquisition and a frame synchronization acquisition with the base station.

FIG. 6 is a flow chart illustrating a conventional PLMN acquisition method of a mobile station in a cellular communication system. In step P1, the mobile station filters and scans received signals according to preset frequency information in order to sense a carrier frequency having a strongest signal strength. In step P2, the mobile station acquires a slot synchronization for timing-synchronizing a mobile station by using a primary synchronization channel (slot synchronization acquisition step). In step P3, the mobile station acquires a frame synchronization and scrambling code group information by using the slot synchronization acquired in step P2 and a secondary synchronization channel. The frame synchronization is used for acquiring a starting location of a frame. The scrambling code group information is used in a corresponding cell (frame synchronization acquisition step). In step P4, the mobile station acquires scrambling code information to be used in the corresponding cell using the scrambling code group information acquired in step P3 and a common pilot channel (scrambling code acquisition step). In step P5, the mobile station demodulates a primary common control physical channel using the scrambling code information acquired in step P4 and receives system information to be broadcasted in the corresponding cell.

In step P6, the mobile station extracts PLMN information included in the system information received in step P5. The PLMN information is business operator identification information. In step P7, the mobile station determines whether the received PLMN information is home PLMN information based on the extracted PLMN information (PLMN information acquisition step), i.e., whether a Mobile Country Code (MCC) and Mobile Network Code (MNC) of the PLMN identity are the same as the MMC and MNC of the International Mobile Subscriber Identity (IMSI). It is assumed that a user automatically selects a PLMN of the mobile station. When the received PLMN information is the home PLMN information, the mobile station registers itself in a base station that transmitted the PLMN information in step P10. When the received PLMN information is not the home PLMN information, the mobile station stores the received PLMN information in available PLMN information in step P8. That is, the mobile station stores the received PLMN information in a PLMN information memory to which the PLMN information is to be stored. In step P9, the mobile station changes a carrier frequency in order to search for the home PLMN. Then the routine returns to step P2.

However, in an overlapped area in which a plurality of business operators provide a mobile service using an identical frequency, the mobile station has a problem in that steps P3 to P10 are performed only for a slot synchronization having a strongest receiving strength in step P2. This problem will be described below in detail with reference to FIG. 3.

In FIG. 3, although a secondary slot synchronization signal is a signal for a home PLMN, the second slot synchronization signal is slightly lower in strength than the first slot synchronization signal. Accordingly, because steps P3 to P5 for the second slot synchronization are not executed on the second signal because it has a lower signal strength, the mobile station cannot receive system information regarding the second slot synchronization signal. As a result, in a situation such as this, the mobile station does receive a home PLMN service in an area where home PLMN service is available. In such a case, the mobile station registers in a different PLMN in order to receive the mobile service. However, when the different PLMN does not provide the mobile service, the mobile station cannot receive the mobile service.

SUMMARY OF THE INVENTION

Accordingly, the present invention has been designed to solve the above and other problems occurring in the prior art. An object of the present invention is to provide methods for acquiring a PLMN of a mobile station and providing PLMN information of a base station in a cellular communication system and a base station for executing the methods, which enable an acquisition of a home PLMN for registering a mobile station in a home base station operated by a first business operator that forms an overlapped signal cell together with a base station operated by a second business operator using the same frequency.

In order to accomplish the above and other objects, in accordance with a first aspect of the present invention, there is provided a method for acquiring a PLMN of a mobile station for registering the mobile station in a cell operated by a first business operator overlapped with a cell of a base station which is operated by a second business operator, the method comprising the steps of:

(i) scanning a plurality of slot synchronizations having different signal strengths using a previously set carrier frequency;

(ii) determining whether a corresponding base station is a home PLMN based on PLMN information included in system information in response to a slot synchronization having a strongest signal strength, the PLMN information being provided from a predetermined base station;

(iii) extracting cell overlapped information from the system information when the corresponding base station is not based on the home PLMN, the cell overlapped information indicating that the home base station forms an overlapped cell together with the base station operated by the second business operator; and (iv) re-executing a public land mobile network acquisition procedure for different slot synchronizations with respect to an identical frequency based on the cell overlapped information.

In accordance with a second aspect of the present invention, there is provided a method for providing public land mobile network information of a home base station operated by a first business operator having a cell which is overlapped with a cell of a base station operated by a second business operator and using an identical frequency, the method comprising the steps of:

(a) producing system information;

(b) producing cell overlapping information indicating that the home base station forms an overlapped cell with the base station operated by the second business operator;

(c) adding the cell overlapping information to the system information; and (d) transmitting the system information including the cell overlapped information to mobile stations, which are located within the overlapped region of the home base station with the base station operated by the second business operator.

In accordance with a third aspect of the present invention, there is provided a mobile station having a home public land mobile network function for registering the mobile station in a cell operated by a first business operator overlapped with a cell of a base station operated by a second business operator, the mobile station comprising:

a controller for acquiring system information corresponding to a slot synchronization having a strongest signal strength among a plurality of acquired slot synchronizations using a previously set carrier frequency during an acquisition of the public land mobile network;

extracting public land mobile network information from the acquired system information, determining whether a corresponding base station is a home public land mobile network based on the extracted public land mobile network information;

determining whether cell overlapped information is present in the system information when the corresponding base station is not the home public land mobile network, the cell overlapped information indicating that the home base station forms the overlapped cell together with the base station operated by the second business operator; and executing a public land mobile network acquisition procedure for different slot synchronizations based on the cell overlapped information.

BRIEF DESCRIPTION OF THE DRAWINGS

The above and other objects, features, and advantages of the present invention will be more apparent from the following detailed description taken in conjunction with the accompanying drawings, in which:

FIGS. 4A to 4D illustrate formats of system information which a base station transmits according to four different embodiments of the present invention;

DETAILED DESCRIPTION OF THE PREFERRED EMBODIMENT

Preferred embodiments of the present invention will be described in detail herein below with reference to the accompanying drawings. In the following description of the present invention, a detailed description of known functions and configurations incorporated herein will be omitted when it may make the subject matter of the present invention rather unclear.

Figure 1:
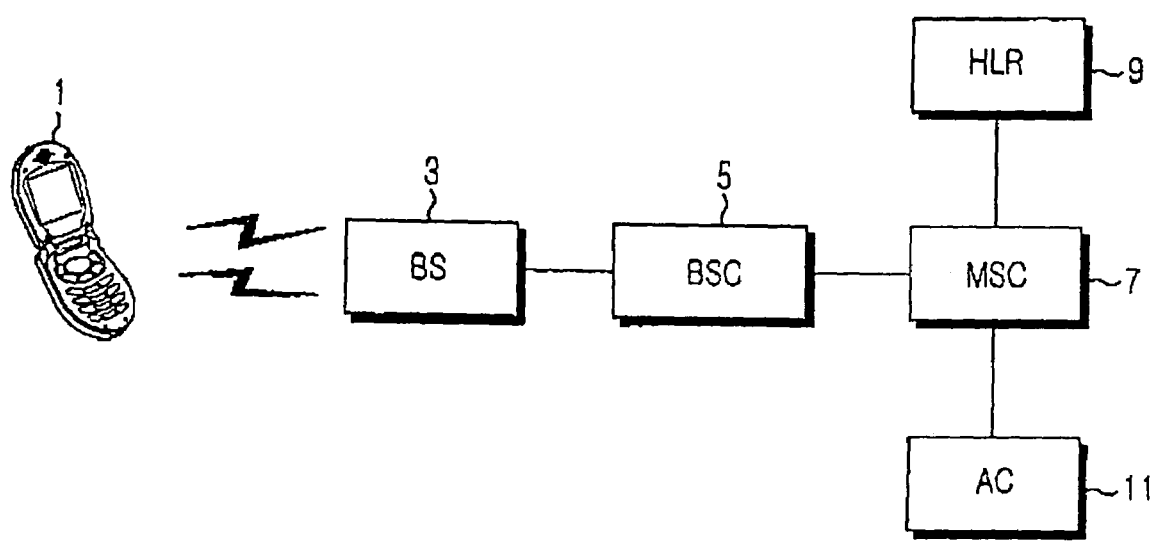
FIG. 1 is a block diagram of a cellular communication system that is used in the present invention.

FIG. 1 is a block diagram of a cellular communication system used in the present invention. When a mobile station (MS) 1 attempts to call another subscriber, a call signal is provided to a mobile switching center (MSC) 7 through a base station (BS) 3 and a base station controller (BSC) 5. The MSC 7 connects a call of the mobile station 1 to a base station of the other mobile station. The MSC 7 is connected to a home location register (HLR) 9 and an assignment center (AC) 11. The HLR 9 stores a location of each mobile station. The AC 11 performs an authentication procedure. More specifically, the mobile station 1 searches for a strongest signal among signals that neighboring base stations, i.e., base stations operated by different business operators in which the mobile station is located, transmit and accesses a corresponding base station (in FIG. 1, base station 3), i.e., the base station with the strongest signal. Once connected, a subscriber dials a terminating number and simultaneously transmits an International Mobile Subscriber Identity (IMSI) number. The MSC 7 performs subscriber authentication through the AC 11. The base station 3 transmits a channel allotment message to the mobile station 1. The mobile station 1 starts calling using the channel allotment message from the base station 3.

For the call connection, the MSC 7 commands the base station 3 to transmit a paging signal in order to detect a location of the mobile station 1. Because the mobile station 1 continues to scan the base station 3, i.e., the mobile station 1 continuously checks whether a paging signal is transmitted from a base station 3, when the mobile station 1 is called, the mobile station 1 sends the IMSI number to a neighboring base station (not shown). Also, when the mobile station 1 enters into a boundary area between a) cell of a base station 3 providing the mobile service and a cell of a neighboring base station, the mobile station 1 reports a timing difference between the cell of the base station 3 and the cell of the neighboring base station. The base station 3 providing the mobile service makes mobile station 1 effectuate a hand-off to the neighboring base station using the timing difference.

Figure 2:
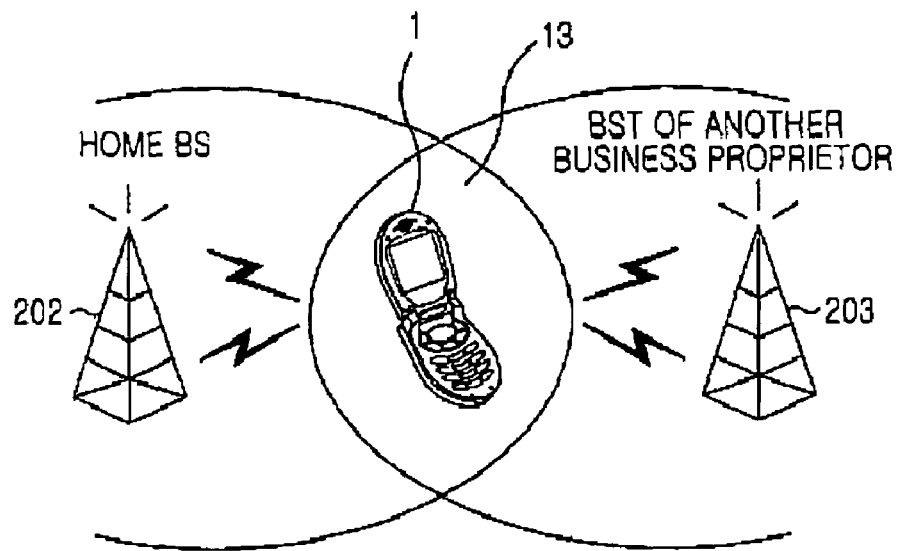
FIG. 2 is an example of an overlapped cell formed between a home base station operated by a first business operator and a base station operated by a second business operator having the same frequency as that of the home base station in an asynchronous cellular communication system.
Figure 3:
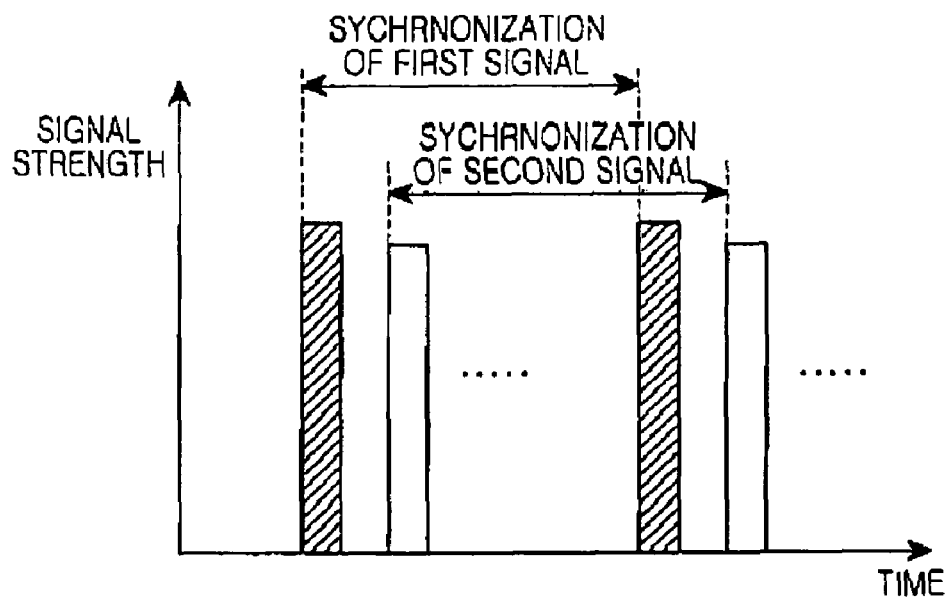
FIG. 3 illustrates a slot synchronization that the mobile station acquires according to an embodiment of the present invention.

FIG. 2 illustrates an overlapped cell formed between a home base station 202 operated by a first business operator and a base station 203 operated by a second business operator having the same frequency as that of the home base station 202 in an asynchronous cellular communication system. FIG. 3 illustrates a slot synchronization that the mobile station 1 acquires according to an embodiment of the present invention. As illustrated in FIG. 2, the slot synchronization in an overlapped cell 13 between the mobile station 1 and the home BS 202 also occurs with the base station 203 operated by the second business operator, which is overlapped with the home base station 202. Consequently, the mobile station 1 cannot acquire a home PLMN exactly, i.e., a PLMN of a base station operated by the first business operator to which the mobile station is subscribed.

With reference to FIG. 2, when the mobile station 1 is located in an overlapped cell area between the home base station 202 and the base station 203, the base station 202 must enable the mobile station 1 to acquire a home PLMN of the home base station 202.

Figure 6:
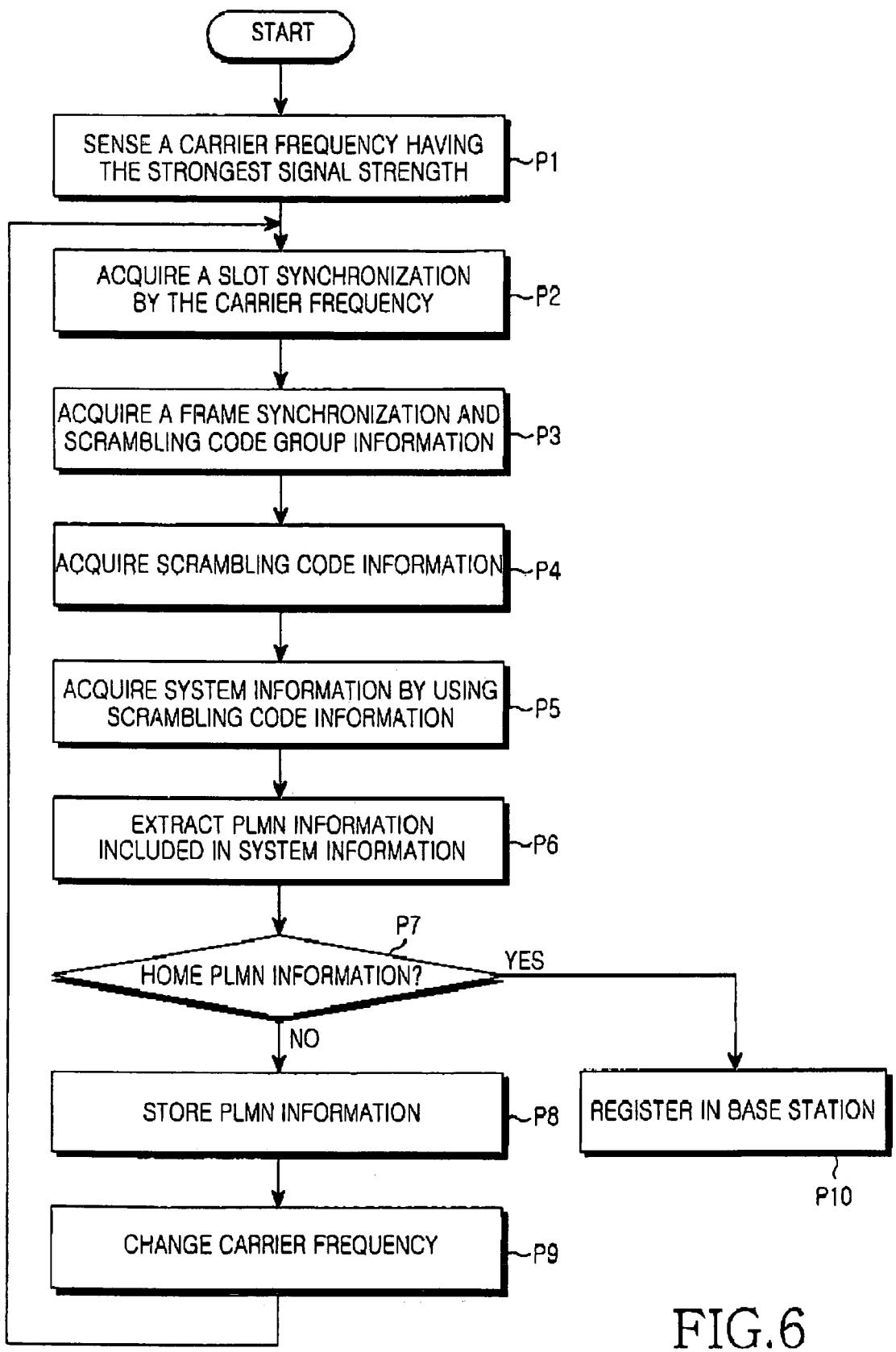
FIG. 6 is a flow chart illustrating a conventional method for acquiring a PLMN of a mobile station in a cellular communication system.

According to an embodiment of the present invention, a base station transmits system information including cell overlapped information, so that the mobile station 1 can quickly and simply register in the base station, e.g., home base station 202. The cell overlapped information indicates that the home base station 202 forms an overlapped cell 13 using a same frequency together with the base station 203, which is operated by the second business operator. Consequently, the mobile station 1 uses the same frequency as that of the home PLMN according to the cell overlapped information provided from the home base station 202. Although the another PLMN signal may be greater in strength than the home PLMN, as illustrated in FIG. 3, the mobile station 1 acquires the home PLMN from the same frequency having a weak signal strength without changing the frequency. Preferably, by loading detailed information in the cell overlapped information, the mobile station 1 does not need to perform all the procedures for acquiring the home PLMN as illustrated in FIG. 6 according to the conventional method. Further, loading detailed information in the cell overlapped information increases processing speed and reduces a load of the mobile station 1.

FIGS. 4A to 4D illustrate formats of system information that the home base station 202 transmits according to 4 different embodiments of the present invention. In accordance with the present invention, the home base station 202 transmits system information including cell overlapped information.

The system information illustrated in FIG. 4A includes a CN (Core Network) Overlapped flag for indicating whether an overlapped PLMN, in which another system, e.g., base station 203, uses an identical frequency, is present in a location area of a mobile station. The system information illustrated in FIG. 4B includes a timing offset and a scrambling code necessary to demodulate the overlapped PLMN. The system information illustrated in FIG. 4C includes an identification number of an overlapped PLMN indicating the PLMN identification number using an identical frequency. The system information illustrated in FIG. 4D includes a number of overlapped PLMNs.

When the cell overlapped information included in the system information is the information for determining whether an overlapped PLMN in which the other system uses an identical frequency, is present in a location area of a mobile station (FIG. 4A), or the overlapped PLMN identification number (FIG. 4C), or the number of overlapped PLMNs (FIG. 4D), and the PLMN information that the mobile station 1 extracts from first acquired system information using a slot synchronization having a strongest signal strength is not the home PLMN information, methods including the steps P3 to P11 as illustrated in FIG. 6 for the other slot synchronization having an identical frequency are again executed.

Alternatively, when the base station 202 adds the timing offset and the scrambling code to the system information which is first acquired as the cell overlapped information (FIG. 4B), the timing offset and the scrambling code included in the first acquired system information enable the mobile station 1 to simply acquire the home PLMN. In order to do this, the base station 202 should provide the system information to the mobile station 1 wherein the scrambling code is added to the system information together with the timing offset. At this time, the base station 202 extracts the timing offset from the system information using timing difference information provided from the other mobile station (not shown), i.e., a mobile station located in a cell of a corresponding cell.

As described above with reference to FIG. 1, when the other mobile station (not shown) in an identical cell in an asynchronous cellular communication travels into a neighboring cell, a hand-off occurs. The mobile station 1 reports a timing difference between the identical cell and the neighboring cell to a previous base station in order to effectuate the hand-off. Accordingly, the mobile station 1 easily acquires home PLMN information based on the timing offset.

Figure 5A:
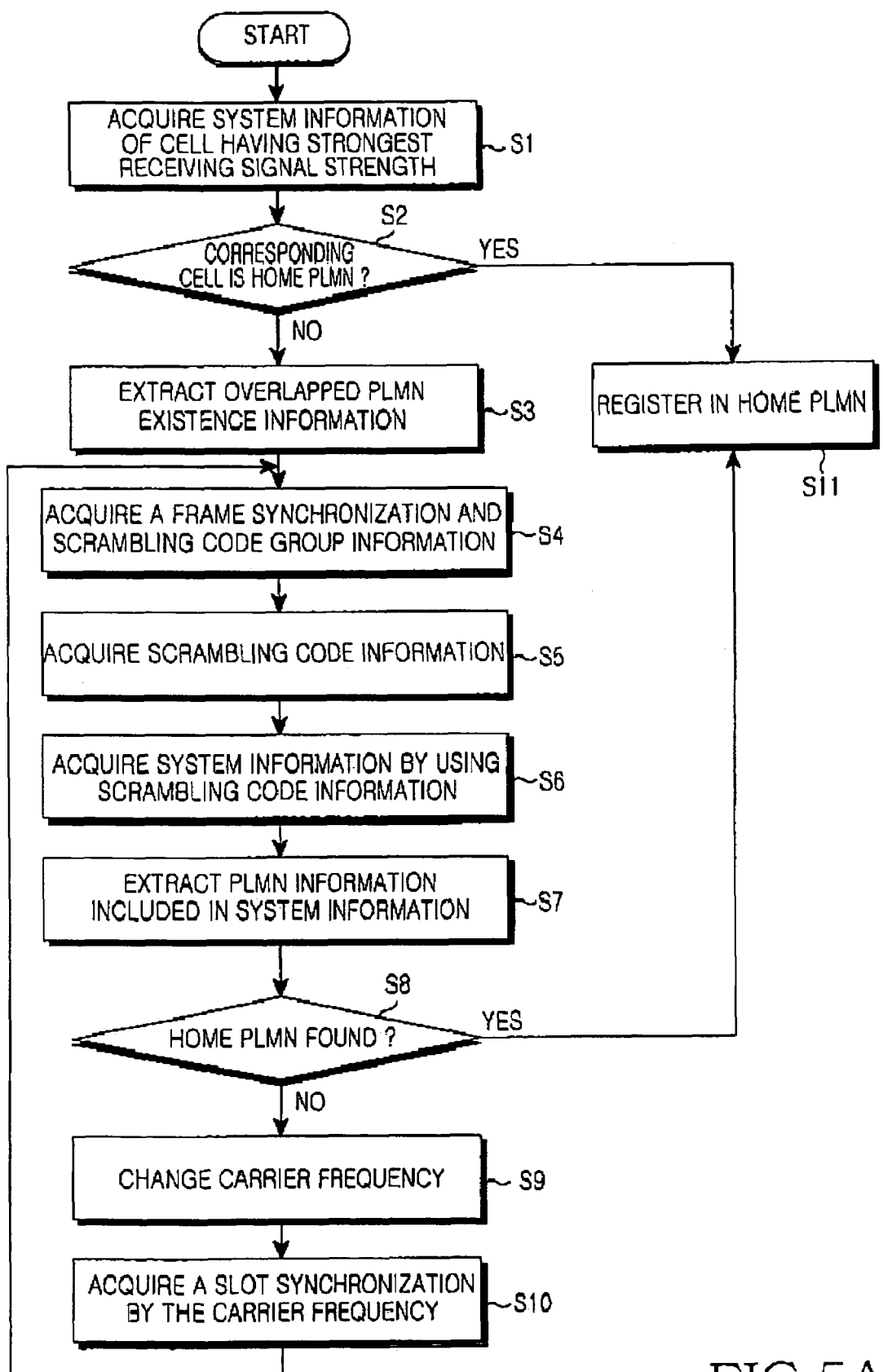
FIGS. 5A to 5D are flow charts illustrating a method for acquiring a home PLMN according to the embodiments of the present invention corresponding to system information illustrated in FIGS. 4A to 4D, respectively.

Hereinafter, a method for acquiring a home PLMN in an overlapped cell by the mobile station 1 according to an embodiment of the present invention with reference to FIGS. 5A to 5D will be described. FIGS. 5A to 5D are flow charts illustrating methods for acquiring a home PLMN according to embodiments of the present invention utilizing the system information illustrated in FIGS. 4A to 4D. FIG. 5A is a flow chart illustrating a method for acquiring a PLMN of the mobile station 1 when information for determining whether an overlapped PLMN in which another system is using an identical frequency is present in a location area of a mobile station is added to the system information (FIG. 4A).

Referring to FIG. 5A, when power of the mobile station 1 is turned on, the mobile station 1 acquires system information of a cell having a strongest receiving signal strength in step S1 by sensing a carrier frequency having the strongest signal strength, and acquiring system information. In step S2, the mobile station 1 extracts PLMN information from the acquired system information, and determines whether a corresponding cell is a home PLMN based on the extracted PLMN information. When the corresponding cell is not the home PLMN, the mobile station 1 extracts overlapped PLMN existence information from the system information provided from the home base station 202 as cell overlapped information in step S3. In step S4, the mobile station 1 acquires a frame synchronization and scrambling code group information. The frame synchronization is used for acquiring a starting location of a frame. The scrambling code group information is used in a corresponding cell (frame synchronization acquisition step).

In step S5, the mobile station acquires scrambling code information to be used in the corresponding cell using the scrambling code group information acquired in step S4 and a common pilot channel (scrambling code acquisition step). In step S6, the mobile station 1 demodulates a primary common control physical channel using the scrambling code information and acquires system information to be broadcasted in the corresponding cell. In step S7, the mobile station extracts PLMN information included in the system information received in step S6.

In step S8, it is determined whether a home PLMN for the slot synchronization having a lower signal strength is found. When the home PLMN for the slot synchronization having lower signal strength is not found, the mobile station 1 changes a carrier frequency in S9 to again acquire the slot synchronization in step S10 and the routine returns to step S4. When it is determined in step S8 that the home PLMN for the slot synchronization having the lower signal strength is found, the mobile station 1 registers its location in the acquired PLMN in step S11.

Figure 5B:
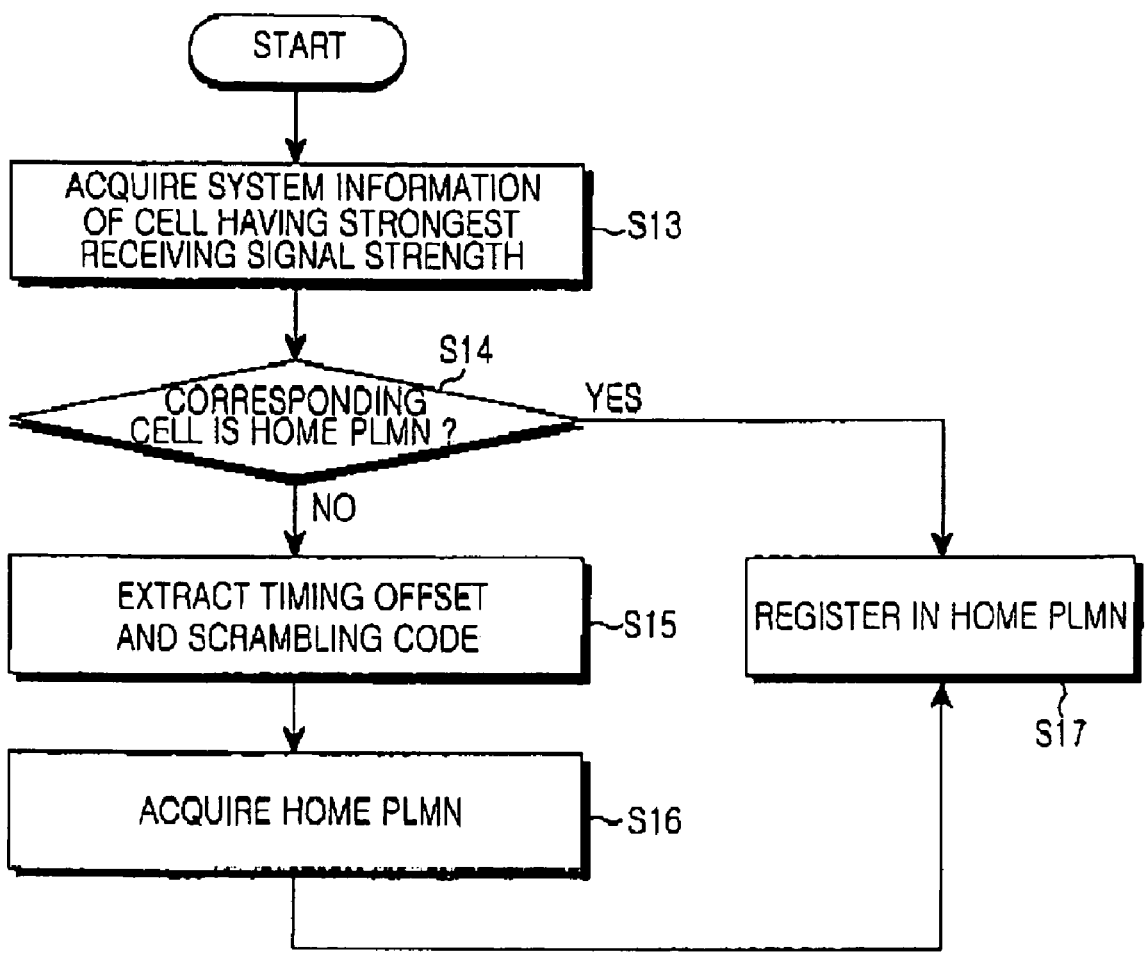

FIG. 5B is a flow chart illustrating a method for acquiring a PLMN of the mobile station 1 when a timing offset and a scrambling code for an overlapped PLMN demodulation are added to the system information. Referring to FIG. 5B, when power of the mobile station 1 is turned on, the mobile station 1 acquires system information of a cell having the strongest receiving signal strength in step S13. In step S14, the mobile station 1 extracts PLMN information from the acquired system information, and determines whether a corresponding cell (base station) is a home PLMN based on the extracted PLMN information. When the corresponding cell is not the home PLMN, the mobile station 1 extracts PLMN information from the system information provided from the home base station 202 as cell overlapped information in step S15. In step S16, the mobile station 1 directly acquires the home PLMN using the timing offset and the scrambling code. After steps S16 or when the corresponding cell is the home PLMN in step S14, in step S17, the mobile station 1 registers its location in the home PLMN.

Figure 5C:
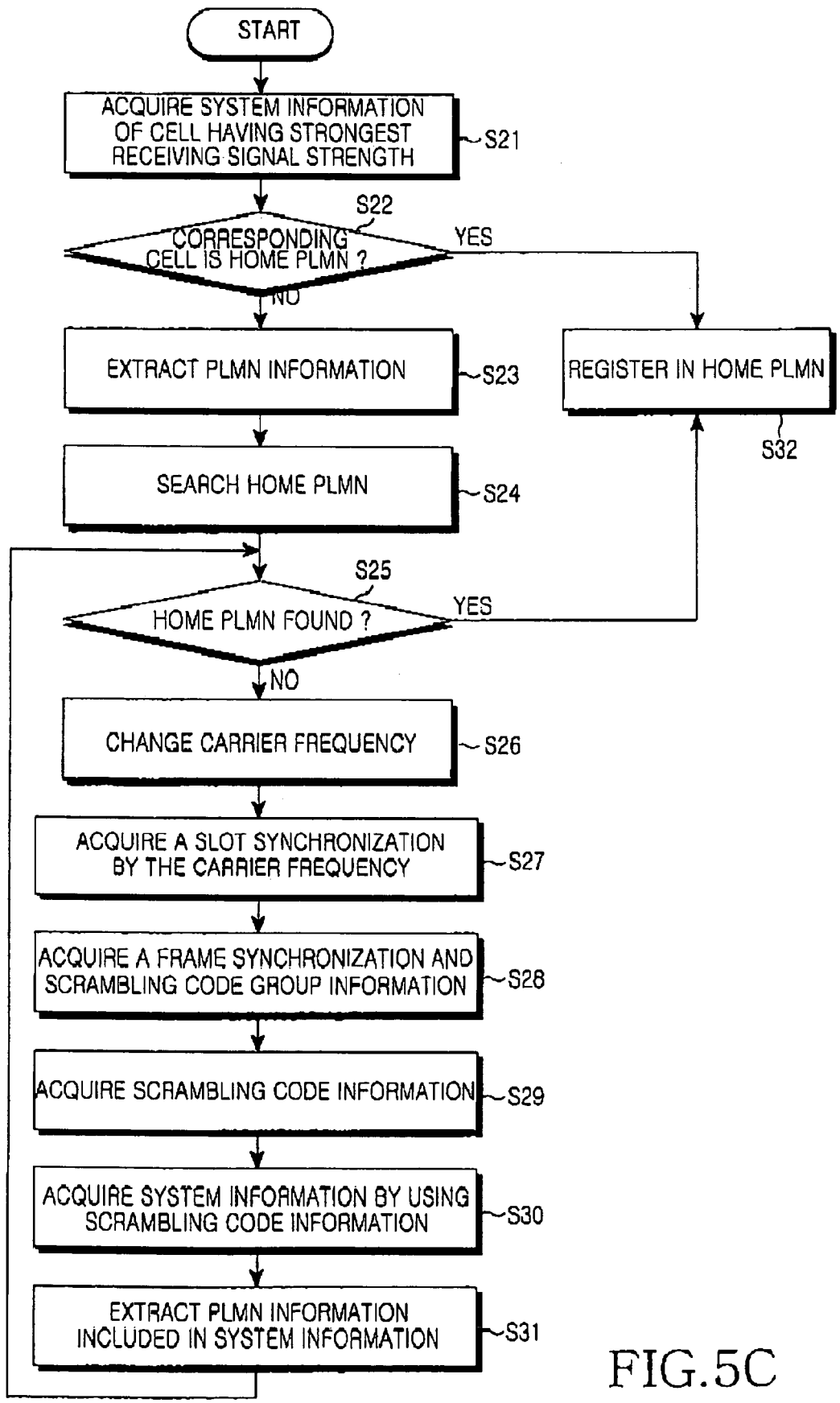

FIG. 5C is a flow chart illustrating a method for acquiring a PLMN of the mobile station 1 when system information includes an identification number of an overlapped PLMN. Referring to FIG. 5C, when power of the mobile station 1 is turned on, the mobile station 1 acquires system information of a cell having the strongest receiving signal strength in step S21. In step S22, the mobile station 1 extracts PLMN information from the acquired system information, and determines whether a corresponding cell (base station) is a home PLMN 202 based on the extracted PLMN information. When the corresponding cell is not the home PLMN, the mobile station 1 extracts PLMN information (PLMN IDs which provide the mobile service using corresponding frequencies) from the system information provided from the base station as cell overlapped information in step S23. The PLMN information includes PLMN information for the home base station and the base station operated by a second business operator. When a home PLMN of the mobile station 1 is included in the PLMN information extracted from the system information, the mobile station 1 searches the home PLMN in step S24. Searching the home PLMN prevents the mobile station 1 from trying an unnecessary slot synchronization for all receiving signals having a relative weaker strength even though the home PLMN uses a frequency that does not provide the mobile service, and reduces a load of the mobile station.

In step S25, it is determined whether the mobile station 1 has found a home PLMN. When the mobile station 1 has not found the home PLMN, the mobile station 1 changes a carrier frequency to acquire a new slot synchronization in step S26. In step S27, the mobile station 1 acquires a slot synchronization for time-synchronizing a mobile station by using a primary synchronization channel (slot synchronization acquisition step). In step S28, the mobile station acquires a frame synchronization and scrambling code group information by using the slot synchronization acquired in step S27 and a secondary synchronization channel. The frame synchronization is used for acquiring a starting location of a frame. The scrambling code group information is used in a corresponding cell (frame synchronization acquisition step).

In step S29, the mobile station acquires scrambling code information to be used in the corresponding cell using the scrambling code group information acquired in step S28 and a common pilot channel (scrambling code acquisition step). In step S30, the mobile station demodulates a primary common control physical channel using the scrambling code information acquired in step S29 and acquires system information to be broadcasted in the corresponding cell. In step S31, the mobile station extracts PLMN information included in the system information received in step P5.

Upon extracting the PLMN information in step S31, it is determined whether the mobile station 1 has found a home PLMN in step S25. When the corresponding cell is the home PLMN, the mobile station 1 registers its location in the acquired home PLMN in step S32.

Figure 5D:
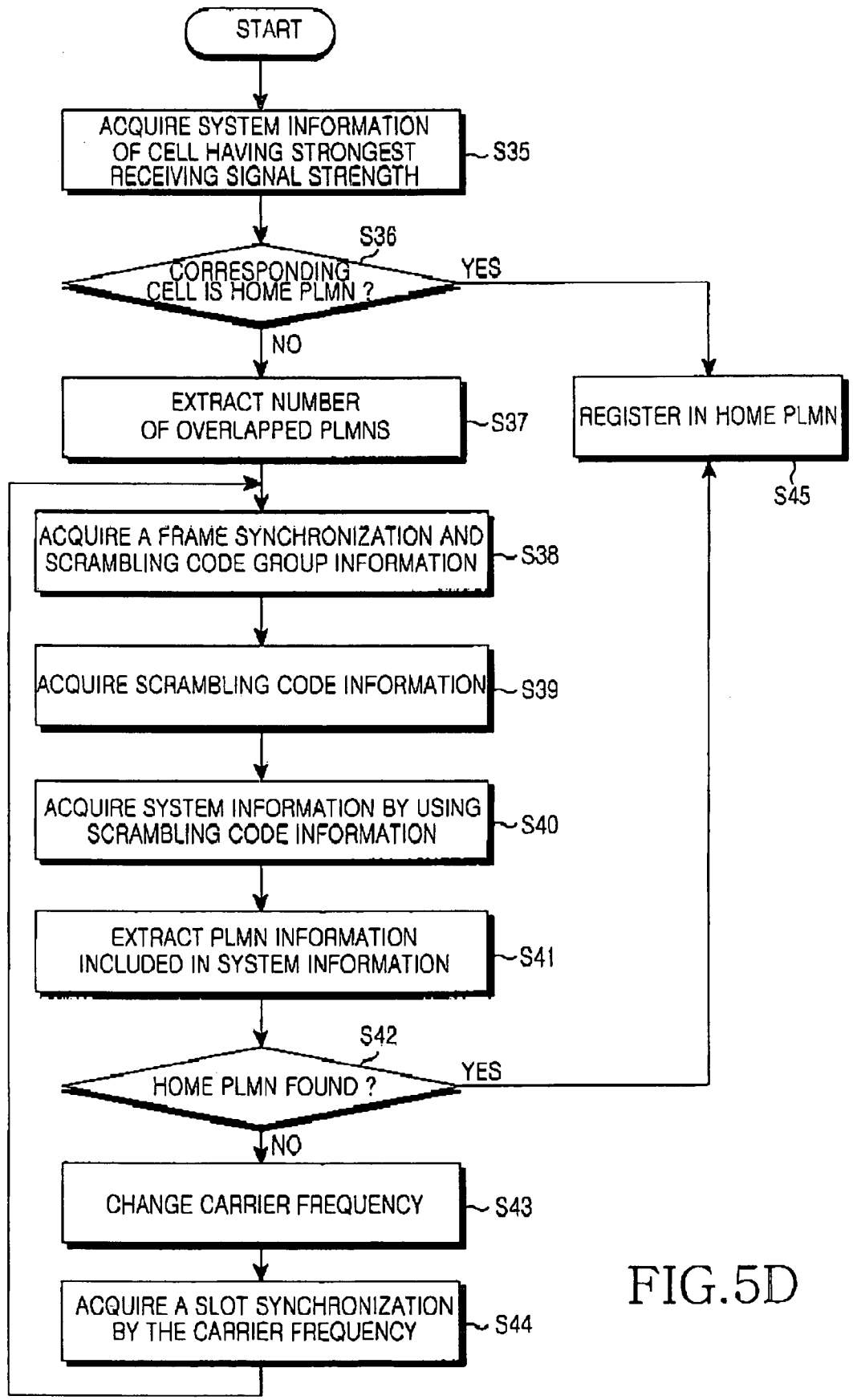

FIG. 5D is a flow chart illustrating a method for acquiring a PLMN of the mobile station 1 when system information includes a number of overlapped PLMNs. Referring to FIG. 5D, when power of the mobile station 1 is turned on, the mobile station 1 acquires system information of a cell having a strongest receiving signal strength in step S35. In step S36, the mobile station 1 extracts PLMN information from the acquired system information, and determines whether a corresponding cell (base station) is a home PLMN based on the extracted PLMN information. When the corresponding cell is not the home PLMN, the mobile station 1 extracts a number of overlapped PLMNs from the acquired system information as cell overlapped information in step S37. In step S38, the mobile station acquires a frame synchronization and scrambling code group information. The frame synchronization is used for acquiring a starting location of a frame. The scrambling code group information is used in a corresponding cell (frame synchronization acquisition step).

In step S39, the mobile station acquires scrambling code information to be used in the corresponding cell using the scrambling code group information acquired in step S38 and a common pilot channel (scrambling code acquisition step). In step S40, the mobile station demodulates a primary common control physical channel using the scrambling code information acquired in step S39 and acquires system information to be broadcasted in the corresponding cell. In step S41, the mobile station extracts PLMN information included in the system information acquired in step S40.

In step S42, it is determined whether the mobile station 1 has found a home PLMN. When the mobile station 1 has not found the home PLMN, the mobile station 1 changes a carrier frequency to acquire a new slot synchronization in step S43, acquires a slot synchronization from the carrier frequency in step S44, and returns to step S38.

However, when the corresponding cell is the home PLMN in step S42, the mobile station 1 registers its location in the acquired home PLMN in step S45.

In the above-described invention, cell overlapped information is added to system information, which is provided to the mobile station 1. The cell overlapped information indicates that all base stations at an area with which signal cells of different business operator base stations are overlapped form an overlapped cell together with other base stations using the same frequency. Consequently, although the mobile station does not acquire a home PLMN for a slot synchronization having a strongest signal strength among a plurality of slot synchronizations according to a characteristic carrier frequency, it acquires a home PLMN for another slot synchronization having a signal strength lower than or equal to that of the characteristic carrier frequency, so that the acquisition of the home PLMN is guaranteed in the mobile station 1.

In the foregoing description, the present invention has been described with reference to a method for acquiring a PLMN using information indicating whether an overlapped PLMN which another system uses an identical frequency is present in a location area of a mobile station, a timing offset and a scrambling code necessary to demodulate another overlapped PLMN, an identification number of an overlapped PLMN indicating another PLMN identification number using an identical frequency, or the number of overlapped PLMNs that is added to system information as cell overlapped information. However, it is to be noted that the present invention is in no way limited to the method. It is understood that the present invention is also applicable to a method for acquiring a PLMN using two or more information types thereof.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for acquiring a public land mobile network (PLMN) of a mobile station for registering the mobile station in a cell overlapped operated by a first business operator with a cell of a base station operated by a second business operator, the method comprising the steps of:
   (i) scanning a plurality of slot synchronizations having different signal strengths using a previously set carrier frequency;
   (ii) determining whether a corresponding base station is operated based on home PLMN information included in system information in response to a slot synchronization having a strongest signal strength;
   (iii) extracting cell overlapped information from the system information when the corresponding base station is not operated based on the home PLMN, the cell overlapped information indicating that a base station is overlapped with the base station operated by the second business operator; and
   (iv) re-executing a PLMN acquisition procedure for different slot synchronizations with respect to an identical frequency based on the cell overlapped information.

2. The method as defined in claim 1, wherein the cell overlapped information includes a timing offset and a scrambling code for demodulating a PLMN overlapped with a base station in a different network, which uses the frequency of the home base station.

3. The method as defined in claim 2, wherein step (iv) further comprises directly acquiring the home PLMN using the timing offset and the scrambling code.

4. The method as defined in claim 1, wherein the cell overlapped information includes information as to whether overlapped areas are present.

5. The method as defined in claim 4, wherein step (iv) comprises:
   (iv-1) acquiring frame synchronizations of different slot synchronizations having signal strengths weaker than the strongest signal strength of the slot synchronization;
   (iv-2) extracting a scrambling code using the frame synchronizations acquired in step (iv-1); and
   (iv-3) acquiring system information provided from the home base station using the scrambling code extracted in step (iv-2).

6. The method as defined in claim 1, wherein the cell overlapped information includes number information of an overlapped PLMN.

7. The method as defined in claim 6, wherein step (iv) comprises:
   (iv-1) acquiring frame synchronizations of different slot synchronizations having signal strengths weaker than the strongest signal strength of the slot synchronization;
   (iv-2) extracting a scrambling code using the frame synchronizations acquired in step (iv-1); and
   (iv-3) acquiring system information provided from the home base station using the scrambling code extracted in step (iv-2), by a number of the PLMN.

8. The method as defined in claim 1, wherein the cell overlapped information includes identification information of a PLMN forming an overlapped cell.

9. The method as defined in claim 8, step (iv) comprises:
   (iv-1) acquiring frame synchronizations of different slot synchronizations with respect to an identical frequency having signal strengths weaker than the strongest signal strength of the slot synchronization;
   (iv-2) extracting a scrambling code using the frame synchronizations acquired in step (iv-1); and
   (iv-3) acquiring system information provided from the home base station using the scrambling code extracted in step (iv-2).

10. A mobile station having a home public land mobile network (PLMN) function for registering a mobile station in a cell operated by a first business operator overlapped with a cell of a base station operated by a second business operator, the mobile station comprising:
    a controller for acquiring system information corresponding to a slot synchronization having a strongest signal strength among a plurality of acquired slot synchronizations using a previously set carrier frequency during an acquisition of the PLMN;
    extracting PLMN information from the acquired system information;
    determining whether a corresponding base station is a home PLMN based on the extracted PLMN information;
    determining whether cell overlapped information is included in the system information when the corresponding base station is not the home PLMN, wherein the cell overlapped information indicates that a base station is overlapped with the base station operated by the second business operator; and
    executing a PLMN acquisition procedure for different slot synchronizations based on the cell overlapped information.

11. The mobile station as defined in claim 10, wherein the cell overlapped information includes information as to whether overlapped areas are present, and the controller acquires frame synchronizations of different slot synchronizations having signal strengths weaker than the strongest signal strength of the slot synchronization and acquires a scrambling code based on the frame synchronizations in order to acquire system information, during the acquisition of the PLMN.

12. The mobile station as defined in claim 10, wherein the cell overlapped information includes number information of an overlapped public land mobile network, and the controller repeats the step of acquiring frame synchronizations for each slot synchronization by a number of the overlapped PLMNs among different slot synchronizations having signal strengths weaker than the strongest signal strength of the slot synchronization, and the step of acquiring a scrambling code based on the acquired frame synchronizations in order to acquire the system information, during the acquisition of the PLMN.

13. The mobile station as defined in claim 10, wherein the cell overlapped information includes a timing offset and a scrambling code for demodulating a PLMN overlapped with a base station in a different network using the frequency of the home base station, and the controller acquires system information based on the timing offset and the scrambling code in order to directly acquire the home PLMN during the acquisition of the PLMN.

14. The mobile station as defined in claim 10, wherein the cell overlapped information includes PLMN information having frequency information of each base station forming the overlapped cell, and the controller selects a slot synchronization to which a frequency included in the PLMN information belongs, acquires a frame synchronization for the selected slot synchronization, and acquires a scrambling code based on the acquired frame synchronization in order to acquire the system information, during the acquisition of the PLMN.

* * * * *